(12) United States Patent
Huang et al.

(10) Patent No.: US 12,022,299 B2
(45) Date of Patent: Jun. 25, 2024

(54) APPARATUS AND METHOD OF CHOOSING WORKING FREQUENCY POINTS

(71) Applicant: Beken Corporation, Shanghai (CN)

(72) Inventors: Yiming Huang, Shanghai (CN); Lianxue Liu, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 422 days.

(21) Appl. No.: 17/647,507

(22) Filed: Jan. 10, 2022

(65) Prior Publication Data

US 2023/0209360 A1   Jun. 29, 2023

(30) Foreign Application Priority Data

Dec. 24, 2021  (CN) .......................... 202111601298.8

(51) Int. Cl.

| | |
|---|---|
| *H04W 16/14* | (2009.01) |
| *H04B 1/713* | (2011.01) |
| *H04W 72/0453* | (2023.01) |
| *H04W 72/541* | (2023.01) |
| *H04B 1/7136* | (2011.01) |
| *H04B 1/715* | (2011.01) |

(Continued)

(52) U.S. Cl.
CPC ............ *H04W 16/14* (2013.01); *H04B 1/713* (2013.01); *H04W 72/0453* (2013.01); *H04W 72/541* (2023.01); *H04B 2001/71362* (2013.01); *H04B 2001/7154* (2013.01); *H04W 4/80* (2018.02); *H04W 84/12* (2013.01)

(58) Field of Classification Search
CPC .................. H04B 1/713; H04B 1/7136; H04B 2001/71362; H04B 2001/7154; H04W 16/14; H04W 4/80; H04W 72/0453; H04W 72/541; H04W 84/12; H04W 84/18; Y02D 30/70
See application file for complete search history.

(56) References Cited

U.S. PATENT DOCUMENTS

10,128,902 B1 *  11/2018  Cheung ................. H04B 1/715
10,778,474 B2 *   9/2020  He .......................... H04L 5/001
(Continued)

*Primary Examiner* — Dung B Huynh
(74) *Attorney, Agent, or Firm* — Schwegman Lundberg & Woessner, P.A.

(57) ABSTRACT

A Bluetooth receiver includes a memory; and one or more processors in communication with the memory, the one or more processors configured to perform operations including: dividing Bluetooth frequencies of the Bluetooth receiver into Bluetooth frequency classes based on a frequency relationship among Bluetooth channels of the Bluetooth receiver and non-overlapping Wi-Fi channels of an interfering Wi-Fi device operating in a Wi-Fi frequency range within the Bluetooth frequency range, each Bluetooth frequency class including one or more Bluetooth frequency groups; determining one or more working Bluetooth frequency groups of the Bluetooth frequency classes based on pre-determined requirements, and saving entire working Bluetooth frequencies within the one or more working Bluetooth frequency groups into a channel map table, which can be used for Adaptive Frequency Hopping (AFH) to reduce Wi-Fi interferences caused by the Wi-Fi device. The Bluetooth receiver may efficiently and quickly choose working Bluetooth frequency points.

20 Claims, 3 Drawing Sheets

(51) Int. Cl.
*H04W 4/80* (2018.01)
*H04W 84/12* (2009.01)

(56) References Cited

U.S. PATENT DOCUMENTS

| | | | |
|---|---|---|---|
| 11,452,110 B1* | 9/2022 | Jorgovanovic | H04W 72/1215 |
| 2008/0100466 A1* | 5/2008 | Lopreiato | H04W 4/029 |
| | | | 340/686.1 |
| 2010/0113078 A1* | 5/2010 | Farajidana | H04B 7/0632 |
| | | | 455/507 |
| 2010/0309793 A1* | 12/2010 | Choi | H04L 1/0026 |
| | | | 370/252 |
| 2013/0190026 A1* | 7/2013 | Agrawal | H04W 28/16 |
| | | | 455/507 |
| 2014/0348124 A1* | 11/2014 | Hasegawa | H04W 72/541 |
| | | | 370/329 |
| 2015/0117364 A1* | 4/2015 | Asterjadhi | H04L 5/003 |
| | | | 370/329 |
| 2016/0105349 A1* | 4/2016 | Zhu | H04W 4/80 |
| | | | 370/252 |
| 2016/0119914 A1* | 4/2016 | Oizumi | H04W 16/14 |
| | | | 370/329 |
| 2016/0381572 A1* | 12/2016 | Shahar | H04W 4/80 |
| | | | 455/41.2 |
| 2017/0086204 A1* | 3/2017 | Jung | H04W 28/0263 |
| 2017/0134882 A1* | 5/2017 | Kao | H04W 72/1215 |
| 2018/0026674 A1* | 1/2018 | Lim | H04W 56/002 |
| | | | 370/338 |
| 2018/0262974 A1* | 9/2018 | Koundinya | H04W 8/005 |
| 2019/0029023 A1* | 1/2019 | Moon | H04W 72/541 |
| 2019/0109655 A1* | 4/2019 | Lizotte | H04W 24/10 |
| 2020/0036456 A1* | 1/2020 | Lizotte | H04W 24/08 |
| 2021/0105031 A1* | 4/2021 | Israel | H04W 88/06 |
| 2021/0136758 A1* | 5/2021 | Haartsen | H04W 56/0005 |
| 2021/0234572 A1* | 7/2021 | Ouyang | H04W 48/16 |
| 2021/0266925 A1* | 8/2021 | Aly | H04W 72/1215 |
| 2022/0038224 A1* | 2/2022 | Cui | H04L 5/001 |
| 2022/0124809 A1* | 4/2022 | Fan | H04W 48/16 |
| 2023/0056736 A1* | 2/2023 | Wentink | H04W 74/0808 |
| 2023/0087730 A1* | 3/2023 | Narula | H04W 8/005 |
| | | | 455/41.2 |
| 2023/0137607 A1* | 5/2023 | Haartsen | H04L 65/1069 |
| | | | 455/41.2 |
| 2023/0164677 A1* | 5/2023 | Das | H04B 17/318 |
| | | | 370/252 |
| 2023/0209584 A1* | 6/2023 | Rahman | H04W 72/1215 |
| | | | 455/452.1 |

\* cited by examiner

APPARATUS AND METHOD OF CHOOSING WORKING FREQUENCY POINTS

CROSS REFERENCE TO RELATED APPLICATIONS

This application claims priority to and incorporates by reference Chinese Patent Application No. 202111601298.8 filed 24 Dec. 2021.

TECHNICAL FIELD

The present application relates to choosing working frequency points for a wireless communication device, and more particularly an apparatus and a method of choosing working Bluetooth frequency points for a Bluetooth device.

BACKGROUND OF THE APPLICATION

Nowadays, widely used wireless communications can be vulnerable to interferences from other sources in the air. In a commonly used frequency band (e.g., 2.4 GHz), nearby wireless communication devices (such as Bluetooth and Wi-Fi devices) may interfere each other, and thus the quality and the throughput of the wireless communications can be affected. Approaches may be adopted to improve anti-interference capabilities of the wireless communications. Bluetooth devices may adopt an Adaptive Frequency Hopping (AFH) technology to reduce Wi-Fi interferences. A technology to quickly find and choose working Bluetooth frequency points to be used by the Bluetooth devices for AFH is required.

BRIEF DESCRIPTION OF THE APPLICATION

According to an embodiment, a Bluetooth receiver comprises: a memory; and one or more processors in communication with the memory, the one or more processors configured to perform operations including: dividing the Bluetooth frequencies into Bluetooth frequency classes based on a frequency relationship among the Bluetooth channels and non-overlapping Wi-Fi channels of an interfering Wi-Fi device operating in a Wi-Fi frequency range within the Bluetooth frequency range, wherein a first Bluetooth frequency class comprises a Bluetooth frequency group including at least a lowest Bluetooth frequency and a highest Bluetooth frequency in the Bluetooth frequency range, wherein a second Bluetooth frequency class comprises a Bluetooth frequency group including Bluetooth frequencies higher than a highest frequency in the Wi-Fi frequency range, wherein a third Bluetooth frequency class comprises Bluetooth frequency groups each including Bluetooth frequencies between two adjacent Wi-Fi channels of the Wi-Fi channels, and wherein a fourth Bluetooth frequency class comprises Bluetooth frequency groups each including Bluetooth frequencies covered by one of the Wi-Fi channels; determining one or more working Bluetooth frequency groups based on pre-determined requirements, wherein a particular Bluetooth frequency group of a particular Bluetooth frequency class is determined qualified or unqualified as a working Bluetooth frequency group by detecting a predetermined number of qualified or unqualified frequencies in the particular Bluetooth frequency group; and saving entire working Bluetooth frequencies within the one or more working Bluetooth frequency groups into a channel map table.

According to an embodiment, a computer-implemented method of choosing working Bluetooth frequency points for a Bluetooth receiver operating in a Bluetooth frequency range, comprises: dividing entire Bluetooth frequencies of the Bluetooth receiver into Bluetooth frequency classes based on a frequency relationship among Bluetooth channels of the Bluetooth receiver and non-overlapping Wi-Fi channels of an interfering Wi-Fi device operating in a Wi-Fi frequency range within the Bluetooth frequency range, wherein a first Bluetooth frequency class comprises a Bluetooth frequency group including at least a lowest Bluetooth frequency and a highest Bluetooth frequency in the Bluetooth frequency range, wherein a second Bluetooth frequency class comprises a Bluetooth frequency group including Bluetooth frequencies higher than the highest frequency in the Wi-Fi frequency range, wherein a third Bluetooth frequency class comprises multiple Bluetooth frequency groups each including Bluetooth frequencies between two adjacent Wi-Fi channels of the Wi-Fi channels, and wherein a fourth Bluetooth frequency class comprises multiple Bluetooth frequency groups each including Bluetooth frequencies covered by one of the Wi-Fi channels; determining one or more working Bluetooth frequency groups based on pre-determined requirements, wherein a particular Bluetooth frequency group of a particular Bluetooth frequency class is determined qualified or unqualified as a working Bluetooth frequency group by detecting a predetermined number of qualified or unqualified frequencies in the particular Bluetooth frequency group; and saving entire working Bluetooth frequencies within the one or more working Bluetooth frequency groups into a channel map table.

According to an embodiment, a non-transitory computer-readable medium stores instructions that, when executed by one or more computer processors of a Bluetooth receiver (100) operating in a Bluetooth frequency range covering multiple Bluetooth channels, cause the Bluetooth receiver to perform operations comprising: dividing Bluetooth frequencies of the Bluetooth receiver into Bluetooth frequency classes based on a frequency relationship among the Bluetooth channels of the Bluetooth receiver and non-overlapping Wi-Fi channels of an interfering Wi-Fi device operating in a Wi-Fi frequency range within the Bluetooth frequency range, wherein a first Bluetooth frequency class comprises a Bluetooth frequency group including at least a lowest Bluetooth frequency and a highest Bluetooth frequency in the Bluetooth frequency range, wherein a second Bluetooth frequency class comprises a Bluetooth frequency group including Bluetooth frequencies higher than a highest frequency in the Wi-Fi frequency range, wherein a third Bluetooth frequency class comprises multiple Bluetooth frequency groups each including Bluetooth frequencies between two adjacent non-overlapping Wi-Fi channels, and wherein a fourth Bluetooth frequency class comprises multiple Bluetooth frequency groups each being covered by one of the Wi-Fi channels; determining one or more working Bluetooth frequency groups based on pre-determined requirements, wherein a particular Bluetooth frequency group of a particular Bluetooth frequency class is determined qualified or unqualified as a working Bluetooth frequency group by detecting a predetermined number of qualified or unqualified frequencies in the particular Bluetooth frequency group; and saving entire working Bluetooth frequencies within the one or more working Bluetooth frequency groups into a channel map table.

BRIEF DESCRIPTION OF THE DRAWINGS

Non-limiting and non-exhaustive embodiments of the present application are described with reference to the FIG. 1 is a diagram illustrating a Bluetooth receiver (100) according to an embodiment.

DETAILED DESCRIPTION OF THE
ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking a Bluetooth receiver and a method of choosing working Bluetooth frequency points for the Bluetooth receiver as example. Those of ordinary skills in the art understand that this is only to describe the application clearly and adequately, rather than limit the scope of the application, which is defined by the appended claims.

The term "Bluetooth frequency point" represents a designation or label number (e.g., 2) associated with a Bluetooth channel (e.g., Bluetooth channel 2) of a Bluetooth receiver, and the Bluetooth channel has a Bluetooth center frequency (e.g., 2404 MHz). A Bluetooth frequency point uniquely corresponds to a Bluetooth channel and a Bluetooth center frequency.

The terms "Bluetooth frequency" and "Bluetooth center frequency" of a Bluetooth channel can be used interchangeably, and the terms "Wi-Fi frequency" and "Wi-Fi center frequency" of a Wi-Fi channel can be used interchangeably in this description.

In an Industrial, Scientific, and Medical (ISM) frequency band (e.g., 2.4 GHz, commonly used by Bluetooth and Wi-Fi devices), nearby Wi-Fi devices may interfere with the Bluetooth communications of the Bluetooth devices, and thus may seriously affect the quality and throughput of the Bluetooth communications.

To reduce the effects of the Wi-Fi interferences, Bluetooth devices may adopt an AFH technology that needs to choose working Bluetooth frequency points to be used by the Bluetooth devices for AFH. For example, a primary Bluetooth device and a secondary Bluetooth device may perform Bluetooth communications and use the AFH technology. In the initial state, the primary and the secondary Bluetooth devices may operate at multiple Bluetooth frequency points in a specific frequency hopping sequence that has been negotiated in advance between the primary and the secondary Bluetooth devices in order to maintain the consistency of the working frequency points for each time slot. While working, the primary and the secondary Bluetooth devices may constantly detect Wi-Fi interferences at each Bluetooth frequency point of each Bluetooth channel so as to evaluate each Bluetooth frequency point of each Bluetooth channel, and may maintain an AFH channel mapping table to store a good-list of good or qualified Bluetooth frequency points that will be used for AFH, a bad-list of bad or unqualified Bluetooth frequency points that will not be used for AFH, and a skeptical-list of Bluetooth frequency points that are uncertain whether to be used.

However, choosing working Bluetooth frequency points for a Bluetooth device for AFH in this way can be time-consuming so as to affect the Bluetooth communication throughput, even causing the Bluetooth communication interruptions. An improved technology to choose efficiently and quickly working Bluetooth frequency points to be used by a Bluetooth device for AFH is thus required.

Figure 1:
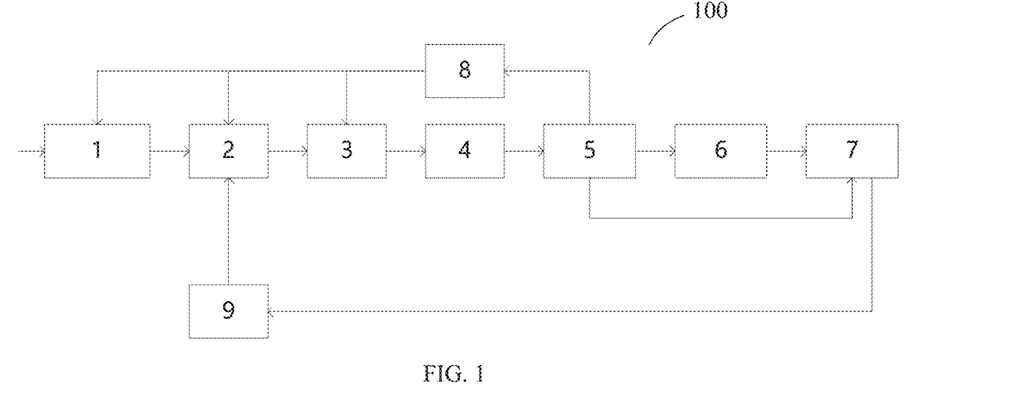

FIG. 1 is a diagram illustrating a Bluetooth receiver 100 according to an embodiment. The Bluetooth receiver 100 may include a Low Noise Amplifier (LNA) 1, a mixer 2, an Intermediate Frequency (IF) filter and amplifier 3, an Analog Digital Converter (ADC) 4, a digital filter and demodulator 5, a synchronization and unpacking module 6, an adaptive frequency selection module 7, an Auto Gain Control (AGC) 8, and a frequency synthesizer 9.

The LNA 1 may amplify a radio frequency (RF) modulated signal that can be received by an antenna (not shown in the figures), and may output an amplified RF modulated signal. The mixer 2 may mix the amplified RF modulated signal and a Local Oscillation (LO) signal produced by the frequency synthesizer 9, and may output an IF modulated signal. The IF filter and amplifier 3 may filter the IF modulated signal to suppress out-of-band interferences, may amplify the filtered IF modulated signal in order to meet the input requirements of the ADC 4, and may output an amplified and filtered IF modulated signal. The ADC 4 may convert the amplified and filtered IF modulated signal into a digital modulated signal, and may output the digital modulated signal.

The digital filter and demodulator 5 may filter the digital modulated signal, and may demodulate the digital modulated signal to obtain a demodulated signal to be output to the AGC 8 and the adaptive frequency selection module 7. The AGC 8 may automatically adjust gains of the LNA 1, the mixer 2, and the IF filter and amplifier 3 in order to meet digital demodulation requirements of the digital filter and demodulator 5. The synchronization and unpacking module 6 may synchronize the demodulated signal to obtain a packet signal, and may unpack the packet signal to obtain a load signal (or a payload signal).

The adaptive frequency selection module 7 may detect interferences at Bluetooth channels that are used by the Bluetooth receiver 100, may evaluate the qualities of the Bluetooth channels, and thus may create an AFH channel mapping table for the Bluetooth receiver 100. The frequency synthesizer 9 may receive a control signal from the adaptive frequency selection module 7 and may produce the LO signal.

Figure 2:
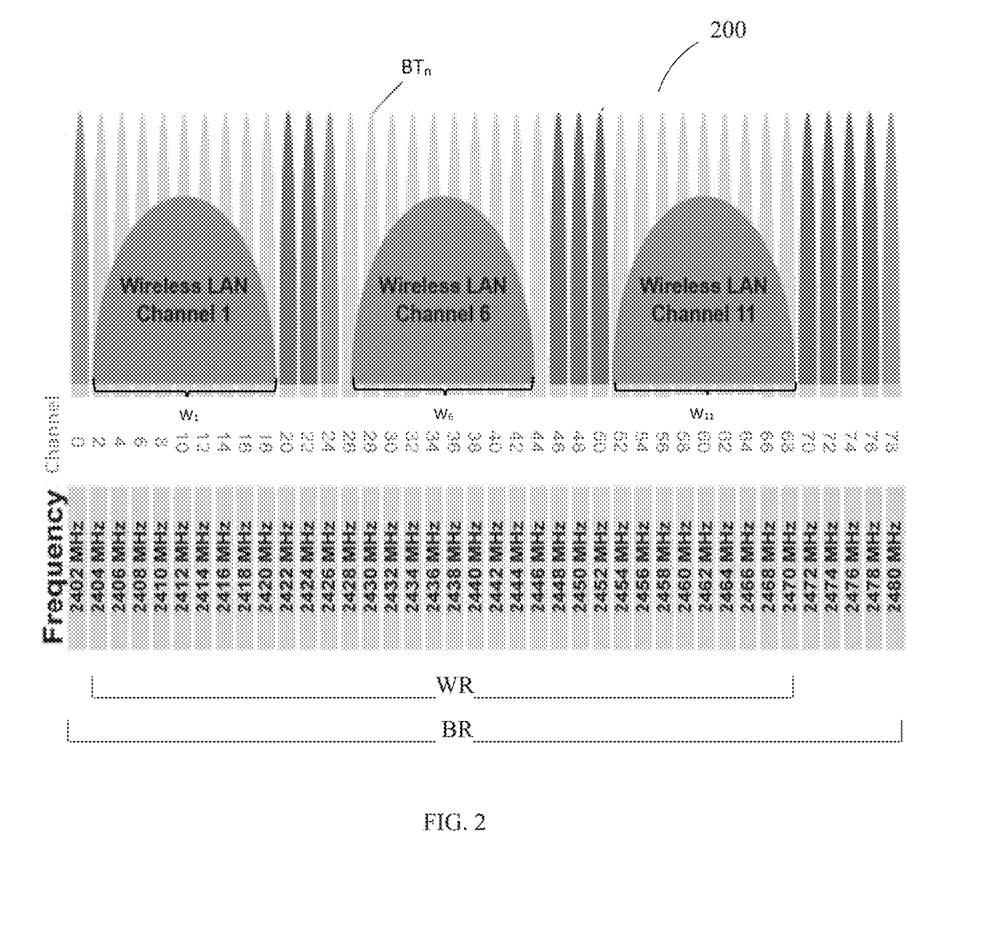
FIG. 2 is a diagram illustrating frequency relationship (200) among Bluetooth channels of a Bluetooth receiver (100) and non-overlapping Wi-Fi channels of an interfering Wi-Fi device according to an embodiment.

FIG. 2 is a diagram illustrating frequency relationship 200 among Bluetooth channels (e.g., 0-78) of a Bluetooth receiver 100 and three non-overlapping Wi-Fi channels (e.g., 1, 6, 11) of an interfering Wi-Fi device (not shown in the figures) according to an embodiment.

The Bluetooth receiver 100 may work in the 2.4 GHz ISM band, which may have a regulatory Bluetooth frequency range (BR) (e.g., 2402-2480 MHz) including 79 Bluetooth channels $BT_n$ (e.g., n=0, 1, 2, 3, ... 78), for example. Each of the Bluetooth channels within the Bluetooth frequency range (BR) may have a unique Bluetooth frequency point, and a unique Bluetooth frequency. For example. Bluetooth channel 6 has a Bluetooth frequency point 6 and a Bluetooth frequency 2408 MHz.

Figure 3:
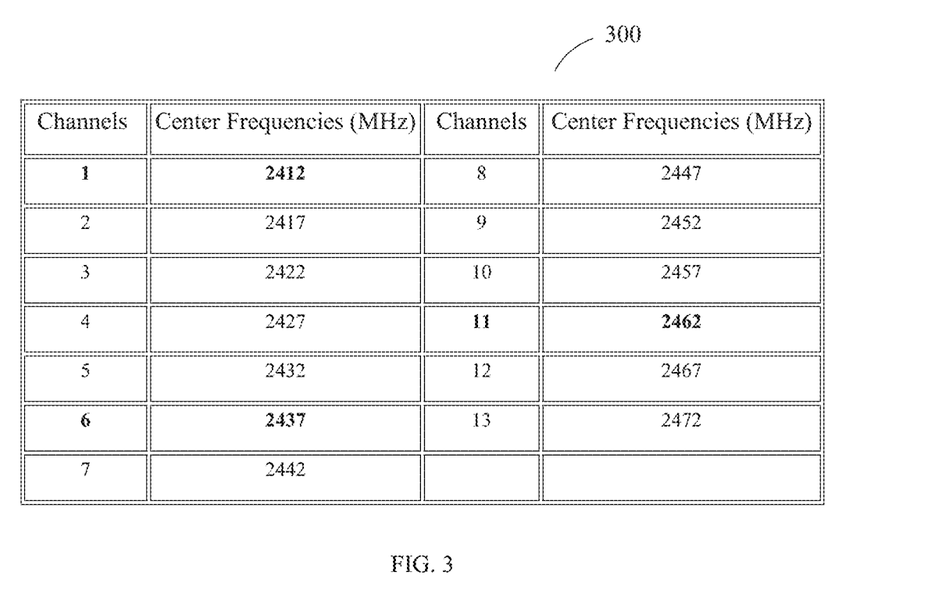
FIG. 3 is a table (300) illustrating Wi-Fi center frequencies (or Wi-Fi frequencies) of an interfering Wi-Fi device according to an embodiment.

FIG. 3 is a table 300 illustrating Wi-Fi frequencies (or Wi-Fi center frequencies) of an interfering Wi-Fi device according to an embodiment. The Wi-Fi device is not limited to have 13 Wi-Fi channels as shown in FIG. 3.

Wi-Fi devices (e.g., wireless LAN devices) may also work in this 2.4 GHz ISM band, and can be primary sources of broadband interferences to the Bluetooth devices. Typically, the bandwidth of each Wi-Fi channel may be 16 or 18 MHz, and thus some Bluetooth channels overlap each other. In an example, a Wi-Fi device (not shown in the figures) may merely use some of the non-overlapping Wi-Fi channels $WF_m$ (e.g., 3 non-overlapping Wi-Fi channels 1, 6, 11, as shown in FIG. 2), rather than using the entire Wi-Fi channels (e.g., Wi-Fi channels 1-13, as shown in FIG. 3), to avoid self-interferences that can be caused by overlapping Wi-Fi channels (e.g., overlapping Wi-Fi channels 2-5 as shown in FIG. 3) of the Wi-Fi device.

As shown in FIG. 2, the 3 non-overlapping Wi-Fi channels (e.g., 1, 6, 11) used by the Wi-Fi device may work within a Wi-Fi frequency range (WR) between a lowest Wi-Fi frequency (e.g., 2404 MHz) of Wi-Fi channel 1 and a highest Wi-Fi frequency (e.g., 2470 MHz) of Wi-Fi channel 11. Each of the non-overlapping Wi-Fi channels (e.g., Wi-Fi channels 1, 6, 11) has a Wi-Fi channel bandwidth $W_m$ (e.g., $W_1$, $W_2$, $W_3$) covering or overlapping with some of the Bluetooth channels $BT_n$. For example, $W_1$ overlaps with Bluetooth channels 2-18, $W_2$ overlaps with Bluetooth channels 26-44, and $W_3$ overlaps with Bluetooth channels 52-68.

Based on the frequency relationship among the Bluetooth channels (0-78) and three non-overlapping Wi-Fi channels (1, 6, 11) of the interfering Wi-Fi device as shown in FIG. 2, the entire Bluetooth channels (0-78) can be classified into 4 classes as explained below.

Bluetooth channels (0, 1) having the lowest and the second lowest Bluetooth frequencies within the Bluetooth frequency range (BR), and Bluetooth channels (78, 77) having the highest and the second highest frequencies in the Bluetooth frequency range (BR), can be classified into a first Bluetooth channel class, corresponding to a first Bluetooth frequency class. They can be assumed most trustable due to being furthest from the interfering non-overlapping Wi-Fi channels (1, 6, 11).

Bluetooth channels (69-78) having Bluetooth frequencies greater than the highest frequency (2470 MHz) in the Wi-Fi frequency range (WR) and less than the second highest center frequency (2479 MHz) in the Bluetooth frequency range (BR) can be classified into a second Bluetooth channel class, corresponding to a second Bluetooth frequency class. They can be assumed relatively trustable due to being beyond the Wi-Fi frequency range.

Bluetooth channels (19-25; 45-51) in the Wi-Fi frequency range (WR) but uncovered by or overlapping with any of the non-overlapping Wi-Fi channels (1, 6, 11) can be classified into a third Bluetooth channel class, corresponding to a third Bluetooth frequency class. They can be relatively trustable due to being uncovered by any of the non-overlapping Wi-Fi channels (1, 6, 11).

Bluetooth channels (2-18; 26-44; 52-68) respectively covered by or overlapping with the non-overlapping Wi-Fi channels (1, 6, 11) can be classified into a fourth Bluetooth channel class, corresponding to a fourth Bluetooth frequency class. They can be relatively non-trustable due to being covered by or overlapping with the non-overlapping Wi-Fi channels (1, 6, 11).

The anti-interference capabilities and reliabilities of the Bluetooth device at different Bluetooth channels may statistically vary as a function of the frequency relationship of among the Bluetooth channels of the Bluetooth device and the non-overlapping Wi-Fi channels of the interfering Wi-Fi device.

Below is an algorithm that can be used to quickly choose working Bluetooth frequency points from the Bluetooth frequency points (e.g., 0-78) for a Bluetooth receiver 100 working in a Bluetooth frequency range (e.g., 2402-2480 MHz) according to an embodiment.

At the start, dividing the 79 Bluetooth frequencies (2402, 2401, 2403, 2404, ... 2480 MHz) of the Bluetooth receiver 100 in the Bluetooth frequency range (BR) into multiple Bluetooth frequency classes (e.g., 4 Bluetooth frequency classes) in the way as shown below:

1) The first Bluetooth frequency class is defined to include one group of Bluetooth frequencies (2402, 2403, 2479, 2480 MHz) including a lowest and a second lowest Bluetooth frequencies (2402, 2403 MHz) as well as a highest and a second highest Bluetooth frequencies (2780, 2479 MHz) within the Bluetooth frequency range (2402-2480 MHz).

2) The second Bluetooth frequency class may include one group of Bluetooth frequencies including Bluetooth frequencies (2471-2478 MHz) that are higher than the highest frequency (2470 MHz) in a Wi-Fi frequency range (WR) (2404-2470 MHz) and lower than the second highest Bluetooth frequency (2479 MHz) in the Bluetooth frequency range (BR) (2402-2480 MHz).

3) The third Bluetooth frequency class may include two groups (2422-2426; 2448-2452 MHz) of Bluetooth frequencies within the Wi-Fi frequency range (WR) (2404-2470) and uncovered by the non-overlapping Wi-Fi frequency channels (1, 6 and 11), and each of the two groups of Bluetooth frequencies of the third Bluetooth frequency class is between two adjacent non-overlapping Wi-Fi channels. The first group of Bluetooth frequencies of the third Bluetooth frequency class may include Bluetooth frequencies (2422-2426 MHz) between adjacent non-overlapping Wi-Fi channels 1 and 6. The second group of Bluetooth frequencies of the third Bluetooth frequency class may include Bluetooth frequencies (2448-2452 MHz) between adjacent non-overlapping Wi-Fi channels 6 and 11.

4) The fourth Bluetooth frequency class may include three groups of Bluetooth frequencies, and each of the three groups of Bluetooth frequencies of the fourth Bluetooth frequency class is covered by one of the non-overlapping Wi-Fi channels (1, 6, 11). The first group of Bluetooth frequencies (2404-2420 MHz) of the fourth Bluetooth frequency class is covered by or overlaps with Wi-Fi channel 1. The second group of Bluetooth frequencies (2428-2446 MHz) of the fourth Bluetooth frequency class is covered by or overlaps with Wi-Fi channel 6. The third group of Bluetooth frequencies (2454-2470 MHz) of the fourth Bluetooth frequency class is covered by or overlaps with Wi-Fi channel 11.

After that, determining one or more working Bluetooth frequency groups from the Bluetooth frequency groups of the Bluetooth frequency classes based on pre-determined requirements as shown below:

1) Predetermining the group of Bluetooth frequencies of the first Bluetooth frequency class as one of the working Bluetooth frequency groups without detection.

2) Upon detecting a predetermined number (e.g., 2) of qualified Bluetooth frequencies in the group of Bluetooth frequencies of the second Bluetooth frequency class, the group of Bluetooth frequencies of the second Bluetooth frequency class is determined as a whole qualified to be one of the working Bluetooth frequency groups.

3) Upon detecting a predetermined number (e.g., 2) of qualified Bluetooth frequencies in a particular group (e.g., the first group or the second group) of Bluetooth frequencies of the third Bluetooth frequency class, the particular group of Bluetooth frequencies of the third Bluetooth frequency class is determined as a whole qualified to be one of the working Bluetooth frequency groups.

For example, upon detecting 2 qualified Bluetooth frequencies in the first group of Bluetooth frequencies of the third Bluetooth frequency class, the first group of Bluetooth frequencies of the third Bluetooth frequency class is determined as a whole qualified to be one of the working Bluetooth frequency groups.

Similarly, upon detecting 2 qualified Bluetooth frequencies in the second group of Bluetooth frequencies of the third Bluetooth frequency class, the second group of Bluetooth frequencies of the third Bluetooth frequency class is determined as a whole qualified to be one of the working Bluetooth frequency groups.

4) Upon detecting a predetermined number (4) of unqualified Bluetooth frequencies in a particular group (e.g., the first group, the second group, or the third group) of Bluetooth frequencies of the fourth Bluetooth frequency class, the particular group of Bluetooth frequencies of the fourth Bluetooth frequency class is determined as a whole unqualified to be one of the working Bluetooth frequency groups.

For example, upon detecting 4 unqualified Bluetooth frequencies in the first group of Bluetooth frequencies of the fourth Bluetooth frequency class, the first group of Bluetooth frequencies of the fourth Bluetooth frequency class is determined as a whole unqualified to be one of the working Bluetooth frequency groups.

Upon detecting 4 unqualified Bluetooth frequencies in the second group of Bluetooth frequencies of the fourth Bluetooth frequency class, the second group of Bluetooth frequencies of the fourth Bluetooth frequency class is determined as a whole unqualified to be one of the working Bluetooth frequency groups.

Upon detecting 4 unqualified Bluetooth frequencies in the third group of Bluetooth frequencies of the fourth Bluetooth frequency class, the third group of Bluetooth frequencies of the fourth Bluetooth frequency class is determined as a whole unqualified to be one of the working Bluetooth frequency groups.

At the end, saving entire working Bluetooth frequencies within the one or more working Bluetooth frequency groups into a channel map table.

This algorithm may quickly find and choose working Bluetooth frequencies (and thus working Bluetooth frequency points) by determining the working Bluetooth frequency groups of the Bluetooth frequency classes with a reduced number of Bluetooth frequency detections.

Figure 4:
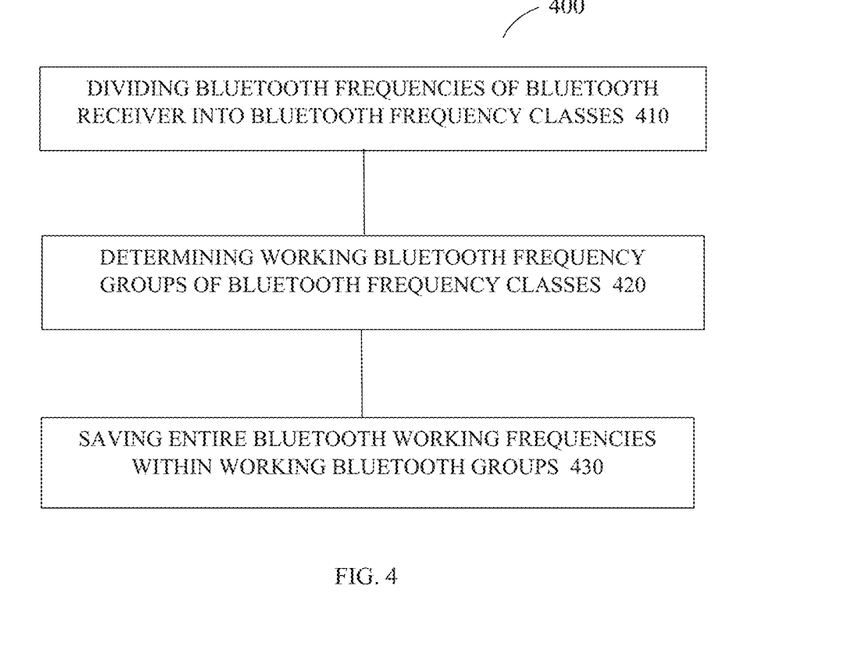
FIG. 4 is a flow chart illustrating a method (400) of choosing working Bluetooth frequency points for a Bluetooth receiver (100) according to an embodiment.

FIG. 4 is a flow chart illustrating a method 400 of choosing working frequency points for a Bluetooth receiver 100 according to an embodiment. The Bluetooth receiver 100 may operate in a Bluetooth frequency range (e.g., 2402-2480 MHz), which may include 79 channels (e.g., 0-78), for example.

At 410, dividing Bluetooth frequencies of the Bluetooth receiver 100 into multiple Bluetooth frequency classes (e.g., 4 Bluetooth frequency classes) based on a frequency relationship among the Bluetooth channels (e.g., 0-78) of the Bluetooth receiver and non-overlapping Wi-Fi channels (e.g., 1, 6, 11) of an interfering Wi-Fi device (not shown in the figures) operating in a Wi-Fi frequency range (e.g., 2404-2470 MHz) within the Bluetooth frequency range.

In an embodiment, a first Bluetooth frequency class may include one Bluetooth frequency group including at least a lowest Bluetooth frequency (e.g., 2402) and a highest Bluetooth frequency (e.g., 2480) in the Bluetooth frequency range. In another embodiment, the first Bluetooth frequency group of the first Bluetooth frequency class may further include a second lowest Bluetooth frequency (e.g., 2403) and a second highest Bluetooth frequency (e.g., 2479) within the Bluetooth frequency range (e.g., 2402-2480 MHz).

In an embodiment, a second Bluetooth frequency class may include one Bluetooth frequency group including Bluetooth frequencies (e.g., 2471, 2472, 2473, . . . 2478 MHz) that are higher than a highest frequency (e.g., 2470) in the non-overlapping Wi-Fi frequency range (e.g., 2404-2470) and lower than the second highest Bluetooth frequency (e.g., 2479) in the Bluetooth frequency range.

In an embodiment, a third Bluetooth frequency class may include multiple Bluetooth frequency groups (e.g., 2 Bluetooth frequency groups) each including Bluetooth frequencies between two adjacent Wi-Fi channels of the Wi-Fi channels. For example, a first Bluetooth frequency group of the third Bluetooth frequency class may include Bluetooth frequencies (e.g., 2421-2427 MHz) between two adjacent Wi-Fi channels 1 and 6, and a second Bluetooth frequency group of the third Bluetooth frequency class may include Bluetooth frequencies (e.g., 2447-2453 MHz) between two adjacent Wi-Fi channels 6 and 11.

In an embodiment, a fourth Bluetooth frequency class may include multiple Bluetooth frequency groups each including Bluetooth frequencies covered by one of the non-overlapping Wi-Fi channels (e.g., 1, 6, 11). For example, a first Bluetooth frequency group of the fourth Bluetooth frequency class is covered by or overlapping with the non-overlapping Wi-Fi channel 1, a second Bluetooth frequency group of the fourth Bluetooth frequency class is covered by or overlapping with the non-overlapping Wi-Fi channel 6, and a third Bluetooth frequency group of the fourth Bluetooth frequency class is covered by or overlapping with the non-overlapping Wi-Fi channel 11.

At 420, determining one or more working Bluetooth frequency groups based on pre-determined requirements. A particular Bluetooth frequency group of a particular Bluetooth frequency class is determined qualified or unqualified as a working Bluetooth frequency group by detecting a predetermined number of qualified or unqualified frequencies in the particular Bluetooth frequency group.

In an embodiment, the Bluetooth frequency group of the first Bluetooth frequency class is predetermined qualified as one of the working Bluetooth frequency groups without detection.

In an embodiment, upon detecting a predetermined number (e.g., 2) of qualified Bluetooth frequencies in the Bluetooth frequency group of the second Bluetooth frequency class, the second Bluetooth frequency group is determined as a whole qualified to be one of the working Bluetooth frequency groups.

In an embodiment, upon detecting a predetermined number (e.g., 2) of qualified Bluetooth frequencies in a particular Bluetooth frequency group of the third Bluetooth frequency class, the particular third Bluetooth frequency group is determined as a whole qualified to be one of the working Bluetooth frequency groups.

For example, upon detecting 2 qualified Bluetooth frequencies in the first Bluetooth frequency group of the third Bluetooth frequency class, the first Bluetooth frequency group of the third Bluetooth frequency class is determined as a whole qualified to be one of the working Bluetooth frequency groups.

Similarly, upon detecting 2 qualified Bluetooth frequencies in the second Bluetooth frequency group of the third Bluetooth frequency class, the second Bluetooth frequency group of the third Bluetooth frequency class is determined as a whole qualified to be one of the working Bluetooth frequency groups.

In an embodiment, upon detecting a predetermined number (e.g., 4) of unqualified Bluetooth frequencies in a particular Bluetooth frequency group of the fourth Bluetooth frequency class, the particular Bluetooth frequency group of the fourth Bluetooth frequency class is determined as a whole unqualified to be one of the working Bluetooth frequency groups.

For example, upon detecting 4 unqualified Bluetooth frequencies in the first Bluetooth frequency group of the fourth Bluetooth frequency class, the first Bluetooth frequency group of the fourth Bluetooth frequency class is determined as a whole unqualified to be one of the working Bluetooth frequency groups.

Similarly, upon detecting 4 unqualified Bluetooth frequencies in the second Bluetooth frequency group of the fourth Bluetooth frequency class, the second Bluetooth frequency group of the fourth Bluetooth frequency class is determined as a whole unqualified to be one of the working Bluetooth frequency groups.

Similarly, upon detecting 4 unqualified Bluetooth frequencies in the third Bluetooth frequency group of the fourth Bluetooth frequency class, the third Bluetooth frequency group of the fourth Bluetooth frequency class is determined as a whole unqualified to be one of the working Bluetooth frequency groups.

In an embodiment, a Bluetooth frequency at a Bluetooth channel is determined qualified or unqualified as a working Bluetooth frequency by detecting a communication signal strength of the Bluetooth frequency. In another embodiment, a Bluetooth frequency at a Bluetooth channel is determined qualified or unqualified as a working Bluetooth frequency by detecting a signal-to-noise ratio of the Bluetooth frequency.

At 430, saving entire working Bluetooth frequencies within the one or more working Bluetooth frequency groups into a channel map table. In an embodiment, the entire working Bluetooth frequencies (and thus the entire working Bluetooth frequency points) are set in good status, and are configured to be used by the Bluetooth device for AFH.

The way may choose efficiently and quickly working Bluetooth frequencies (and thus choose working Bluetooth frequency points) by groups of the Bluetooth frequency classes with reduced Bluetooth frequency detections.

Figure 5:
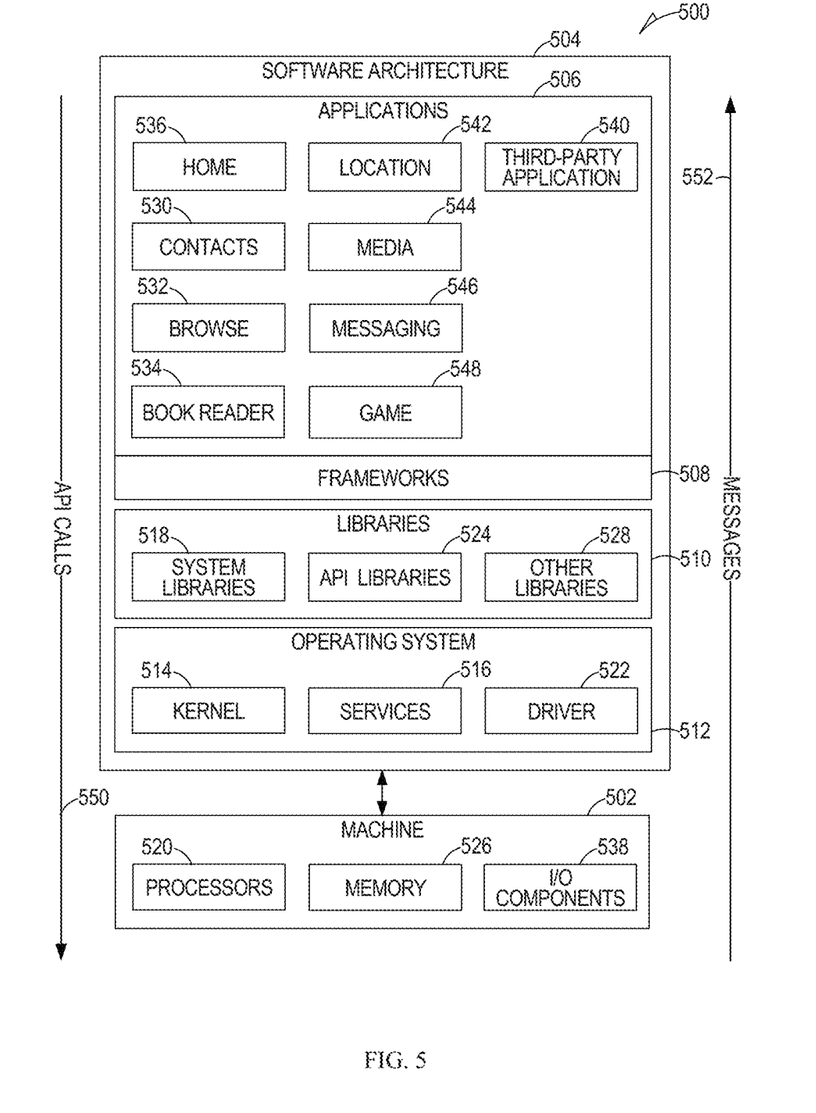
FIG. 5 is a block diagram showing a software architecture (500) within which examples may be implemented.

FIG. 5 is a block diagram 500 illustrating a software architecture 504, which can be installed on a Bluetooth receiver 100 (more specifically on an adaptive frequency selection module 7 of the Bluetooth receiver 100) described herein.

The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionalities. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A Bluetooth receiver (100) operating in a Bluetooth frequency range covering multiple Bluetooth channels respectively having multiple Bluetooth frequencies, comprising:
 a memory; and
 one or more processors in communication with the memory, the one or more processors configured to perform operations including:
  dividing the Bluetooth frequencies into Bluetooth frequency classes based on a frequency relationship among the Bluetooth channels and non-overlapping Wi-Fi channels of an interfering Wi-Fi device operating in a Wi-Fi frequency range within the Bluetooth frequency range, wherein a first Bluetooth frequency class comprises a Bluetooth frequency group including at least a lowest Bluetooth frequency and a highest Bluetooth frequency in the Bluetooth frequency range, wherein a second Bluetooth frequency class comprises a Bluetooth frequency group including Bluetooth frequencies higher than a highest frequency in the Wi-Fi frequency range, wherein a third Bluetooth frequency class comprises Bluetooth frequency groups each including Bluetooth frequencies between two adjacent Wi-Fi channels of the Wi-Fi channels, and wherein a fourth Bluetooth frequency class comprises Bluetooth frequency groups each including Bluetooth frequencies covered by one of the Wi-Fi channels;
  determining one or more working Bluetooth frequency groups based on pre-determined requirements, wherein a particular Bluetooth frequency group of a particular Bluetooth frequency class is determined qualified or unqualified as a working Bluetooth frequency group by detecting a predetermined number of qualified or unqualified frequencies in the particular Bluetooth frequency group; and
  saving entire working Bluetooth frequencies within the one or more working Bluetooth frequency groups into a channel map table.

2. The Bluetooth receiver of claim 1, wherein the Bluetooth frequency group of the first Bluetooth frequency class further comprises a second lowest Bluetooth frequency and a second highest Bluetooth frequency within the Bluetooth frequency range.

3. The Bluetooth receiver of claim 1, wherein the Bluetooth frequency group of the first Bluetooth frequency class is predetermined qualified as one of the working Bluetooth frequency groups without detection.

4. The Bluetooth receiver of claim 1, wherein the Bluetooth frequency group of the second Bluetooth frequency class comprise at least 7 Bluetooth frequencies.

5. The Bluetooth receiver of claim 1, wherein each Bluetooth frequency group of the third Bluetooth frequency class comprises 7 Bluetooth frequencies.

6. The Bluetooth receiver of claim 1, wherein each Bluetooth frequency group of the fourth Bluetooth frequency class comprises at least 17 Bluetooth frequencies.

7. The Bluetooth receiver of claim 1, wherein upon detecting a predetermined number of qualified Bluetooth frequencies in the Bluetooth frequency group of the second Bluetooth frequency class, the Bluetooth frequency group of the second Bluetooth frequency class is determined as a whole qualified to be one of the working Bluetooth frequency groups, and wherein the predetermined number is at least 2.

8. The Bluetooth receiver of claim 1, wherein upon detecting a predetermined number of qualified Bluetooth frequencies in a particular Bluetooth frequency group of the third Bluetooth frequency class, the particular Bluetooth frequency group of the third Bluetooth frequency class is determined as a whole qualified to be one of the working Bluetooth frequency groups, and wherein the predetermined number is at least 2.

9. The Bluetooth receiver of claim 1, wherein upon detecting a predetermined number of unqualified Bluetooth frequencies in a particular Bluetooth frequency group of the fourth Bluetooth frequency class, the particular Bluetooth frequency group of the fourth Bluetooth frequency class is determined as a whole unqualified to be one of the working Bluetooth frequency groups, and wherein the predetermined sub-number is at least 4.

10. The Bluetooth receiver of claim 1, wherein a particular Bluetooth frequency is detected qualified or unqualified as a working Bluetooth frequency by detecting a communication signal strength or a signal-to-noise ratio of the particular Bluetooth frequency.

11. A computer-implemented method (400) of choosing working Bluetooth frequency points for a Bluetooth receiver operating in a Bluetooth frequency range, comprising:
 dividing entire Bluetooth frequencies of the Bluetooth receiver into Bluetooth frequency classes based on a frequency relationship among Bluetooth channels of the Bluetooth receiver and non-overlapping Wi-Fi channels of an interfering Wi-Fi device operating in a Wi-Fi frequency range within the Bluetooth frequency range, wherein a first Bluetooth frequency class comprises a Bluetooth frequency group including at least a lowest Bluetooth frequency and a highest Bluetooth frequency in the Bluetooth frequency range wherein a second Bluetooth frequency class comprises a Bluetooth frequency group including Bluetooth frequencies higher than the highest frequency in the Wi-Fi frequency range, wherein a third Bluetooth frequency class comprises multiple Bluetooth frequency groups each including Bluetooth frequencies between two adjacent Wi-Fi channels of the Wi-Fi channels, and wherein a fourth Bluetooth frequency class comprises multiple Bluetooth frequency groups each including Bluetooth frequencies covered by one of the Wi-Fi channels;

determining one or more working Bluetooth frequency groups based on pre-determined requirements, wherein a particular Bluetooth frequency group of a particular Bluetooth frequency class is determined qualified or unqualified as a working Bluetooth frequency group by detecting a predetermined number of qualified or unqualified frequencies in the particular Bluetooth frequency group; and saving entire working Bluetooth frequencies within the one or more working Bluetooth frequency groups into a channel map table.

12. The computer-implemented method of claim 11, wherein the entire working Bluetooth frequencies are set in good status, and are configured to be used for Adaptive Frequency Hopping (AFH).

13. The computer-implemented method of claim 11, wherein the Bluetooth frequency group of the first Bluetooth frequency class further comprises a second lowest Bluetooth frequency and a second highest Bluetooth frequency within the Bluetooth frequency range.

14. The computer-implemented method of claim 11, wherein the Bluetooth frequency group of the first Bluetooth frequency class is predetermined qualified as one of the working Bluetooth frequency groups without detection.

15. The computer-implemented method of claim 11, wherein upon detecting a predetermined number of qualified Bluetooth frequencies in the Bluetooth frequency group of the second Bluetooth frequency class, the Bluetooth frequency group of the second Bluetooth frequency class is determined as a whole qualified to be one of the working Bluetooth frequency groups, and wherein the predetermined number is at least 2.

16. The computer-implemented method of claim 11, wherein upon detecting a predetermined number of qualified Bluetooth frequencies in a particular Bluetooth frequency group of the third Bluetooth frequency class, the particular Bluetooth frequency group of the third Bluetooth frequency class is determined as a whole qualified to be one of the working Bluetooth frequency groups, and wherein the predetermined number is at least 2.

17. The computer-implemented method of claim 11, wherein upon detecting a predetermined number of unqualified Bluetooth frequencies in a particular Bluetooth frequency group of the fourth Bluetooth frequency class, the particular Bluetooth frequency group of the fourth Bluetooth frequency class is determined as a whole unqualified to be one of the working Bluetooth frequency groups, and wherein the predetermined sub-number is at least 4.

18. The computer-implemented method of claim 11, wherein a particular Bluetooth frequency is detected qualified or unqualified as a working Bluetooth frequency by detecting a communication signal strength or a signal-to-noise ratio of the particular Bluetooth frequency.

19. A non-transitory computer-readable medium storing instructions that, when executed by one or more computer processors of a Bluetooth receiver (100) operating in a Bluetooth frequency range covering multiple Bluetooth channels, cause the Bluetooth receiver to perform operations comprising:

dividing Bluetooth frequencies of the Bluetooth receiver into Bluetooth frequency classes based on a frequency relationship among the Bluetooth channels of the Bluetooth receiver and non-overlapping Wi-Fi channels of an interfering Wi-Fi device operating in a Wi-Fi frequency range within the Bluetooth frequency range, wherein a first Bluetooth frequency class comprises a Bluetooth frequency group including at least a lowest Bluetooth frequency and a highest Bluetooth frequency in the Bluetooth frequency range, wherein a second Bluetooth frequency class comprises a Bluetooth frequency group including Bluetooth frequencies higher than a highest frequency in the Wi-Fi frequency range, wherein a third Bluetooth frequency class comprises multiple Bluetooth frequency groups each including Bluetooth frequencies between two adjacent non-overlapping Wi-Fi channels, and wherein a fourth Bluetooth frequency class comprises multiple Bluetooth frequency groups each being covered by one of the Wi-Fi channels;

determining one or more working Bluetooth frequency groups based on pre-determined requirements, wherein a particular Bluetooth frequency group of a particular Bluetooth frequency class is determined qualified or unqualified as a working Bluetooth frequency group by detecting a predetermined number of qualified or unqualified frequencies in the particular Bluetooth frequency group; and saving entire working Bluetooth frequencies within the one or more working Bluetooth frequency groups into a channel map table.

20. The non-transitory computer-readable medium of claim 19, wherein the entire Bluetooth working frequencies are set in good status, and are configured to be used for Adaptive Frequency Hopping (AFH).

* * * * *